UNITED STATES PATENT OFFICE.

JOHN H. McELROY AND ROBERT YOUNG, OF PITTSBURG, PENNSYLVANIA.

IMPROVEMENT IN METHODS OF TREATING NATURAL GAS.

Specification forming part of Letters Patent No. 171,400, dated December 21, 1875; application filed November 23, 1875.

*To all whom it may concern:*

Be it known that we, JOHN H. McELROY and ROBERT YOUNG, of Pittsburg, Pennsylvania, have invented a new and useful Method of Treating Petroleum-Gas, of which the following is a specification:

The invention relates to a process for rendering the natural gas obtained from the ground in the immediate vicinity of oil-wells sufficiently buoyant and illuminative for lighting purposes.

The natural gas which is obtained in the vicinity of oil-wells has a specific gravity of about .603, and is consequently too heavy for illuminating purposes, although when operated upon by a draft it may be fed into a furnace, and assist in heating the same. The said gas has an illuminating power of about nine and a half candles. It is composed of carbureted hydrogen, carbonic acid, oxide of carbon, and free oxygen.

The illuminating power of the gas is mainly attributable to the first-named ingredient, the second and third tending to give it weight, while the fourth, by its presence, depreciates the aggregate lighting power of the gas. It is obvious, therefore, that to produce from the natural gas an improved gas, having superior illuminating power, it is necessary to free the carbureted hydrogen from the three substances last named, which would leave it in a condition wherein it may be burned alone or mixed with other gaseous material to increase its illuminating power. To thus purify this natural gas is the purpose of the present invention.

The present process effects its result by first taking the gas from the ground, and passing it over or in contact with a hot surface. This disunites the elementary particles, which converts the free oxygen and the oxide of carbon into carbonic acid. After this step in the process the material consists of carbureted hydrogen and carbonic acid; but the gravity of the latter is so great as to materially detract from the value of the gas for illuminating purposes, the composition not being sufficiently buoyant for that use, although it may be burned with good results in a furnace.

The specific gravity of the said composition is reduced through a process of lime purification, or treating it with the oxide or hydrated protoxide of calcium. This removes the carbonic acid, and also the $\frac{16}{22}$ parts of oxygen, which it contains, thus producing a gas having a gravity of .505, which is sufficiently light for purposes of illumination. The gas thus produced is now in a condition to receive any of the substances generally used to enrich coal-gases.

We are aware that gas obtained directly from the oil-well has been treated by passing it through a water-trap, and thence through heaters to a furnace for heating purposes; but such process develops a gas that is suitable only for combustion, being too heavy for illuminating purposes, and besides being charged with carbonic acid; therefore

What we claim as novel, and desire to secure by Letters Patent, is—

The process of preparing illuminating-gas from natural gas, which consists in heating the gas, thus converting the carbonic oxide into carbonic acid, which is afterward eliminated by lime purification, all substantially as set forth.

In testimony that we claim the foregoing method of treating petroleum-gas, as above described, we have hereunto set our hands and seals this 22d day of November, 1875.

JOHN H. McELROY. [L. S.]
ROBT. YOUNG. [L. S.]

Witnesses:
THOS. SIMPSON,
WM. GARDNER.